United States Patent
Nilsson et al.

(10) Patent No.: US 10,477,410 B1
(45) Date of Patent: Nov. 12, 2019

(54) CHANNEL SELECTION IN AN UNLICENSED FREQUENCY BAND

(71) Applicant: Telefonaktiebolaget LM Ericsson (publ), Stockholm (SE)

(72) Inventors: Thomas Nilsson, Malmö (SE); Leif Wilhelmsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/465,727

(22) PCT Filed: Dec. 20, 2016

(86) PCT No.: PCT/EP2016/081999
§ 371 (c)(1),
(2) Date: May 31, 2019

(87) PCT Pub. No.: WO2018/113934
PCT Pub. Date: Jun. 28, 2018

(51) Int. Cl.
*H04W 72/00* (2009.01)
*H04W 16/14* (2009.01)
*H04W 72/04* (2009.01)

(52) U.S. Cl.
CPC ....... *H04W 16/14* (2013.01); *H04W 72/0453* (2013.01); *H04W 72/0486* (2013.01)

(58) Field of Classification Search
CPC ............. H04W 16/14; H04W 72/0453; H04W 72/0486
See application file for complete search history.

(56) References Cited

U.S. PATENT DOCUMENTS

| 2010/0091670 | A1 | 4/2010 | Uln et al. | |
| 2015/0208253 | A1 | 7/2015 | Kim et al. | |
| 2016/0095110 | A1* | 3/2016 | Li | H04W 72/1215 370/329 |
| 2016/0269978 | A1 | 9/2016 | Bashar et al. | |
| 2016/0295420 | A1* | 10/2016 | Luo | H04W 16/14 |

(Continued)

FOREIGN PATENT DOCUMENTS

| CN | 105072690 A | 11/2015 |
| WO | 2017105307 A1 | 6/2017 |

OTHER PUBLICATIONS

ZTE, "Duscussion on the UL LBT for LAA", 3GPP TSG RAN WG1 Meeting #83, Anaheim, US, Nov. 15, 2015, pp. 1-9, R1-156993, 3GPP.

(Continued)

*Primary Examiner* — Barry W Taylor
(74) *Attorney, Agent, or Firm* — Coats & Bennett, PLLC

(57) ABSTRACT

A process for selecting frequency channel(s) used by a network node (20) operating in an unlicensed band is disclosed. To that end, a network node (20) analyzes a signal received for each of multiple frequency channels using autocorrelation techniques, and thus without first demodulating the signals, to determine what types of wireless communication devices (32) are contributing to the load of each frequency channel. The network node (20) then selects one of the frequency channels for scheduling communications in the unlicensed band with a wireless communication device (30), where the selection is responsive not only to the estimated load, but also to the identified types of other wireless communication devices (32).

15 Claims, 7 Drawing Sheets

(56) References Cited

U.S. PATENT DOCUMENTS

2016/0323915 A1    11/2016  Liu et al.
2018/0084547 A1*  3/2018  Gupta .................. H04J 11/0083
2018/0288663 A1* 10/2018  Ziren .................... H04W 16/14

OTHER PUBLICATIONS

Mukherjee, A. et al., "Licensed-Assisted Access LTE: Coexistence with IEEE 802.11 and the Evolution toward 5G", IEEE Communications Magazine, Jun. 1, 2016, pp. 50-57, IEEE.

* cited by examiner

CHANNEL SELECTION IN AN UNLICENSED FREQUENCY BAND

TECHNICAL FIELD

The solution presented herein generally relates to channel selection for a wireless communication device in a network, and more particularly to channel selection in an unlicensed frequency band.

BACKGROUND

The ever increasing need for more frequency spectrum in wireless communications has recently shifted the attention of standards developers to unlicensed frequency bands. Given the large amount of spectrum available in unlicensed frequency bands, the capacity in Long-Term Evolution (LTE), developed for the 3rd Generation Partnership Project (3GPP), could potentially be increased. However, unlicensed frequency bands come with additional challenges associated with, e.g., managing interference and coexisting with other technologies.

In response, a Licensed-Assisted Access (LAA) framework in 3GPP has been introduced. The LAA framework (3GPP Release 13) builds on carrier aggregation solutions introduced in Release 10 LTE to access the additional bandwidth in the unlicensed frequency bands. FIG. 1 shows an exemplary LAA framework 40, where an enhanced NodeB (eNB) uses and configures a secondary cell (SCell) 44 or an LAA carrier on the unlicensed band. The primary cell (PCell) 42 carries the more critical real-time traffic and control information, while the LAA carrier will be used to increase the capacity for less sensitive data, e.g., best effort data. The next 3GPP release may enable LAA to operate without a licensed primary carrier in a more stand-alone fashion, which may present additional challenges. In contrast with legacy Wi-Fi standards, the LAA uplink is scheduled and is not allowed to contend for access on its own. Instead, the User Equipments (UEs) receive so called uplink grants from the eNB containing information regarding when the UEs are allowed to transmit. Uplink and downlink transmissions are usually contained within the same transmission opportunity (TXOP). This way, the eNB protects the uplink from channel competing technologies.

The need to coexist with other technologies operating in the same frequency band presents a challenge to the use of the unlicensed frequency bands for the LAA carrier. The major technology operating in the unlicensed frequency band today is Wi-Fi, which is governed by the Wi-Fi standard IEEE 802.11 and all its variants. The traditional method used by IEEE 802.11 devices to coexist and share the spectrum is the so called Carrier Sense Multiple Access with Collision Avoidance (CSMA/CA). Devices following this scheme use carrier sensing to detect other transmissions, and perform back-off to defer transmissions until the channel is found idle. This algorithm is also known as a Listen-Before-Talk (LBT) scheme.

IEEE 802.11ax is the latest Wi-Fi technology variant and is currently being standardized by the IEEE 802.11ax task group (TGax). Two of the most prominent new features in 802.11ax are uplink/downlink Orthogonal Frequency Division Multiple Access (OFDMA) and uplink Multi-User Multiple-Input-Multiple-Output (MU-MIMO). Another important feature, which is generally not found in earlier variants of IEEE 802.11, is a scheduled uplink. Traditionally the uplink and downlink in Wi-Fi have operated under the same channel access rules. Specifically, the non-network nodes have contended for the channel using CSMA/CA. The motivation behind this design has been to maintain a low complexity and has not caused any problems for smaller networks. However, when the number of uplink devices increases, as expected with 802.11ax, the downlink will gradually receive a smaller share of the capacity, i.e., 1/(N+1) of the total capacity when there are N uplink devices and assuming all devices have non-empty buffers.

In 802.11ax, a tone plan has been set for a new Fast Fourier Transform (FFT) size of 256 (4 times the size used by the legacy standard, which is 64). The smallest allocated sub-band, generally referred to as a resource unit (RU), consists of 26 subcarriers, where each RU contains two pilot tones. The largest RU for 20 MHz contains 242 tones, including 8 pilot tones. There are many more tone unit sizes for different bandwidths. This tone plan is required for resource allocation with OFDMA in uplink and downlink. The increased FFT size in 802.11ax results in OFDM symbols that are four times longer for the data field. Note that the legacy preamble in 802.11ax packets still uses the legacy FFT size of 64.

In conventional LAA systems, the eNB contends for access for both the downlink (DL) and the uplink (UL). In a network with contending Wi-Fi devices (one BSS), e.g., devices bound by the IEEE 802.11 standards, the LAA cell will at most receive 1/(N+2) of the total capacity for both the uplink and downlink, when all devices have data to transmit, due to the fact that the network node as well as the Wi-Fi devices are contending for the channel. The coexistence between two LAA cells will give a fair sharing of the capacity between the cells, in contrast to a scenario where a LAA cell is coexisting with one Wi-Fi BSS. Thus, there is a need for additional channel allocation solutions. In particular, there is a need for solutions that enable the LAA to share the radio resources in a more even way with Wi-Fi, while still complying with all rules defining channel access fairness.

SUMMARY

The solution presented herein facilitates the selection of the frequency channel(s) used by a network node operating in an unlicensed band. To that end, the network node analyzes a signal received for each of multiple frequency channels, without first demodulating the signals, to determine what types of wireless communication devices are contributing to the load of each frequency channel. The network node then selects one of the frequency channels for scheduling communications in the unlicensed band with a wireless communication device, where the selection is responsive not only to the estimated load, but also to the identified types of other wireless communication devices.

One exemplary embodiment comprises a method of selecting frequency channels for a wireless network operating in an unlicensed band and comprising a network node and a wireless communication device. The network node is configured to send downlink signals to the wireless communication device and to receive uplink signals from the wireless communication device. The method is implemented by the network node and comprises receiving a signal for each of two or more frequency channels, and estimating a load of each of two or more frequency channels responsive to the received signals. The method further comprises, for each of the two or more frequency channels, correlating the corresponding received signal with one or more delayed versions of the corresponding received signal to generate one or more autocorrelation results. Each delayed version of the corresponding received signal is associated with a different delay. The method further comprises, for each of the two or more frequency channels, identifying one or more types of wireless communication devices associated with the corresponding received signal using at least one of the one or more autocorrelation results. The method further comprises selecting one of the two or more frequency channels for the unlicensed band responsive to the estimated loads and the identified types of wireless communication devices, and scheduling communications in the unlicensed band with the wireless communication device on the selected frequency channel.

Another exemplary embodiment comprises a network node in a wireless network operating in an unlicensed band. The wireless network comprises the network node and a wireless communication device, where the network node is configured to send downlink signals to the wireless communication device and to receive uplink signals from the wireless communication device. The network node comprises a receiver circuit, a load circuit, an identification circuit, a selection circuit, and a scheduling circuit. The receiver circuit is configured to receive a signal for each of two or more frequency channels. The load circuit is configured to estimate a load of each of the two or more frequency channels responsive to the received signals. The identification circuit comprises a correlation circuit configured to, for each of the two or more frequency channels, correlate the corresponding received signal with one or more delayed versions of the corresponding received signal to generate one or more autocorrelation results. Each delayed version of the corresponding received signal is associated with a different delay. The identification circuit is configured to identify, for each of the two or more frequency channels, one or more types of wireless communication devices associated with the corresponding received signal using at least one of the one or more autocorrelation results. The selection circuit is configured to select one of the two or more frequency channels for the unlicensed band responsive to the estimated loads and the identified types of wireless communication devices. The scheduling circuit is configured to schedule communications in the unlicensed band with the wireless communication device on the selected frequency channel.

Another exemplary embodiment comprises a network node in a wireless network operating in an unlicensed band. The wireless network comprises the network node and a wireless communication device, where the network node is configured to send downlink signals to the wireless communication device and to receive uplink signals from the wireless communication device. The network node comprises a receiver module, a load module, an identification module, a selection module, and a scheduling module. The receiver module is configured to receive a signal for each of two or more frequency channels. The load module is configured to estimate a load of each of the two or more frequency channels responsive to the received signals. The identification module comprises a correlation module configured to, for each of the two or more frequency channels, correlate the corresponding received signal with one or more delayed versions of the corresponding received signal to generate one or more autocorrelation results. Each delayed version of the corresponding received signal is associated with a different delay. The identification module is configured to identify, for each of the two or more frequency channels, one or more types of wireless communication devices associated with the corresponding received signal using at least one of the one or more autocorrelation results. The selection module is configured to select one of the two or more frequency channels for the unlicensed band responsive to the estimated loads and the identified types of wireless communication devices. The scheduling module is configured to schedule communications in the unlicensed band with the wireless communication device on the selected frequency channel.

Another exemplary embodiment comprises a non-transitory computer readable medium storing a computer program product for controlling a processing circuit in a network node. The network node is configured to send downlink signals to a wireless communication device and to receive uplink signals from the wireless communication device. The computer program product comprises software instructions which, when run on the processing circuit, causes the network node to receive a signal for each of the two or more frequency channels and estimate a load of each of two or more frequency channels responsive to the received signals. The computer program product comprises software instructions which, when run on the processing circuit, further causes the network node to, for each of the two or more frequency channels, correlate the corresponding received signal with one or more delayed versions of the corresponding received signal to generate one or more autocorrelation results. Each delayed version of the corresponding received signal is associated with a different delay. The computer program product comprises software instructions which, when run on the processing circuit, further causes the network node to identify one or more types of wireless communication devices associated with the corresponding received signal using at least one of the one or more autocorrelation results. The computer program product comprises software instructions which, when run on the processing circuit, further causes the network node to select one of the two or more frequency channels for the unlicensed band responsive to the estimated loads and the identified types of wireless communication devices, and schedule communications in the unlicensed band with the wireless communication device on the selected frequency channel.

Another exemplary embodiment comprises a computer program comprising instructions which, when executed on at least one processor of a wireless communication device, causes the wireless communication device to execute the method of selecting frequency channels for a wireless network operating in an unlicensed band disclosed and claimed herein. In some exemplary embodiments, a computer-readable medium comprises the computer program. In some exemplary embodiments, the computer-readable medium comprises a non-transitory computer readable medium.

DETAILED DESCRIPTION

Figure 1:
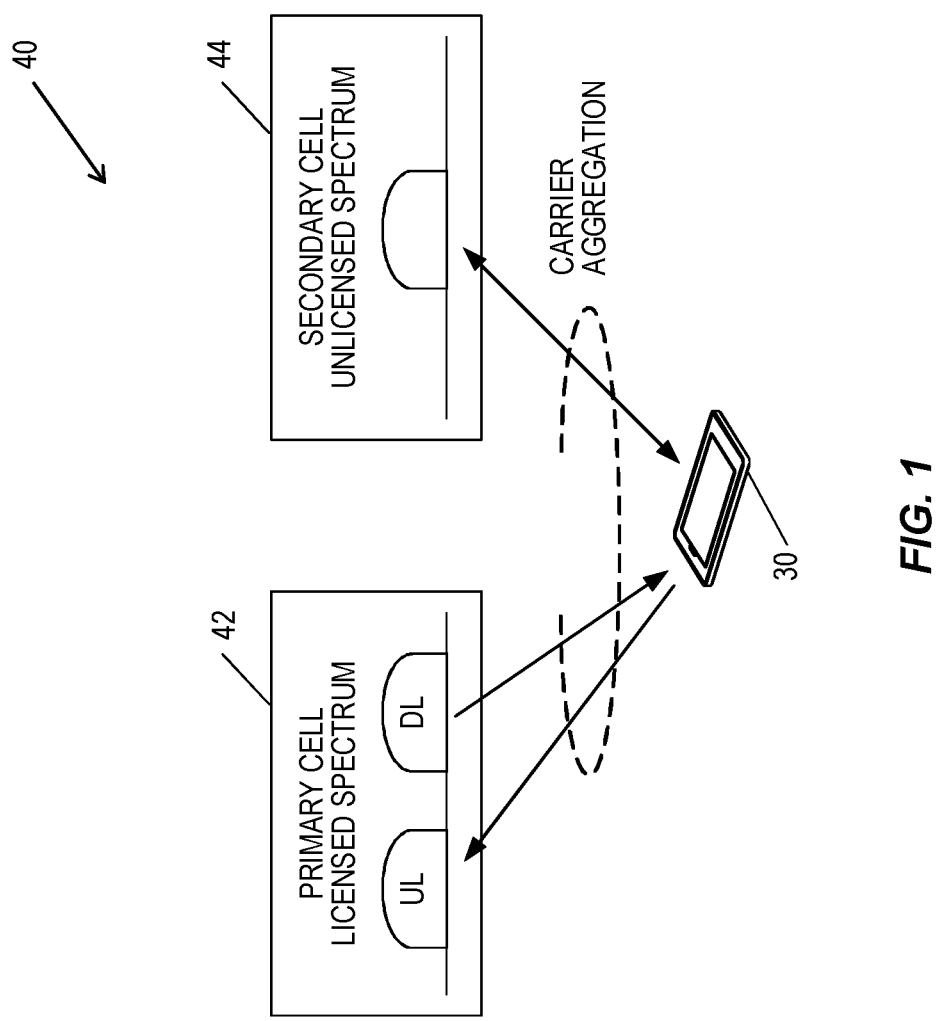
FIG. 1 shows an exemplary framework for using licensed and unlicensed spectrum for wireless communications.

The solution presented herein enables a network node (e.g., node 20 in FIG. 2) to more fairly assess channel conditions and resources when selecting frequency channel(s) for communications with a wireless communication device 30 (e.g., device 30 in FIG. 2) in an unlicensed band, where the wireless communication device 30 sends uplink signals to the network node 20 and receives downlink signals from the network node 20. It will be appreciated that the solution presented herein applies to any wireless network 10 operating in the unlicensed frequency band, e.g., an LAA wireless network, an enhanced LAA wireless network, a MulteFire wireless network, etc. In the context of the solution presented herein, it should be understood that a network node 20 may comprise a radio network node (e.g., a radio base station, NB, eNB, etc.). Exemplary wireless communication devices 30 comprise, but are not limited to, a machine-to-machine (M2M) device, a machine-type communications (MTC) device, and/or a NB-IoT device. The wireless communication device 30 may also comprise a User Equipment (UE), however it should be noted that the UE does not necessarily have a "user" in the sense of an individual person owning and/or operating the device. A wireless communication device 30 may also be referred to as a radio device, a radio communication device, a wireless terminal, or simply a terminal. Unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms Machine-to-Machine (M2M) device, Machine Type Communication (MTC) device, wireless sensor, and sensor may also be used. It should be understood that these devices may be UEs, but are generally configured to transmit and/or receive data without direct human interaction. In an Internet of Things (IoT) scenario, a wireless communication device 30 as described herein may be, or may be comprised in, a machine or device that performs monitoring or measurements, and transmits the results of such monitoring measurements to another device or a network. Particular examples of such machines are power meters, industrial machinery, or home or personal appliances, e.g., refrigerators, televisions, personal wearables such as watches etc. In other scenarios, a wireless communication device 30 as described herein may be comprised in a vehicle and may perform monitoring and/or reporting of the vehicle's operational status or other functions associated with the vehicle.

PCT Application No. PCT/SE2015/051370, "An access point, a station and methods therein for access point selection in a wireless local area network", by Leif Wilhelmsson and Filip Mestanov and referred to herein as the '370 application, provides one solution for dealing with scheduling issues associated with 802.11ax. The '370 application uses the idea that it may be more favorable to join a network with 802.11ax devices than a network with devices not able to support multi-user transmission and reception. However, in the solution of the '370 application, each Access Point (AP) knows what station(s) it serves, and thus can determine the number of 802.11ax-capable devices currently associated with a frequency channel. Each AP then signals this number as part of an extended version of the Base Station Subsystem (BSS) Load element to other Wi-Fi units so that such Wi-Fi units can use this information. A normal BSS Load element already contains information about the number of associated devices and the load, and the '370 application adds specifics about the number of 802.11ax devices to this BSS Load element. However, the solution presented in the '370 application is not applicable to non-WiFi units.

The solution presented herein uses one or more correlations of a received signal associated with a particular frequency channel with delayed versions of the received signal to determine what types of devices are associated with the particular frequency channel. This approach takes advantage of the cyclic prefix redundancy typically associated with OFDM symbols. In particular, the solution presented herein correlates a first set of samples from the received signal with another set of samples from a delayed version of the same received signal to generate an autocorrelation result. When the delay used to generate the delayed version of the received signal matches the symbol duration, the autocorrelation result will include one or more peaks.

Figure 2:
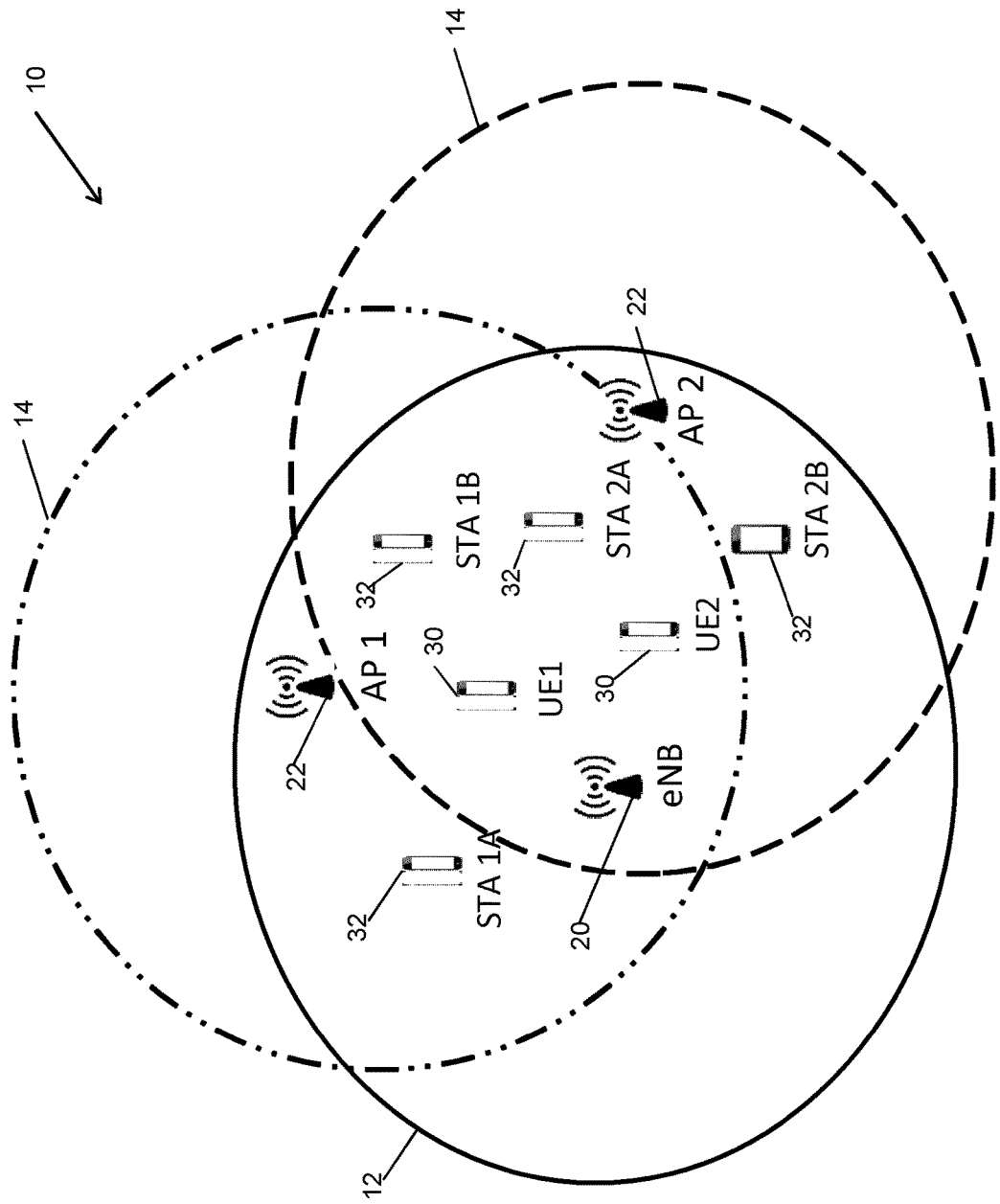
FIG. 2 shows an exemplary wireless system of interacting LTE and Wi-Fi networks.

FIG. 2 shows one exemplary wireless communication system 10 comprising a cellular communication network 12, e.g., an LTE communications network, and a pair of Wi-Fi networks 14. Network 12 operates in an unlicensed band and includes a network node 20 (e.g., eNB) serving a plurality of wireless communication devices 30, e.g., User Equipments (UEs). Network 12 may, for example, comprise an LAA wireless network, an enhanced LAA (eLAA) wireless network, MulteFire, etc. Each Wi-Fi network 14 operates according to the controlling IEEE 802.11 standard, and comprises an access point (AP) 22 serving a plurality of wireless communication devices 32, e.g., stations (STA). Further, each Wi-Fi network 14 operates according to a different frequency channel (indicated by the different dashed markings). As shown in FIG. 2, network 12 overlaps with networks 14, which enables eNB 20 to detect transmissions from the Wi-Fi networks 14 on their respective frequency channels. As discussed herein, eNB 20 selects one of the frequency channels for communications in the unlicensed band. The solution presented herein provides an improved approach for making such a selection. Those skilled in the art will appreciate that the system diagram of FIG. 2 is exemplary, and is not intended to limit the scope of the solution presented herein.

Figure 3:
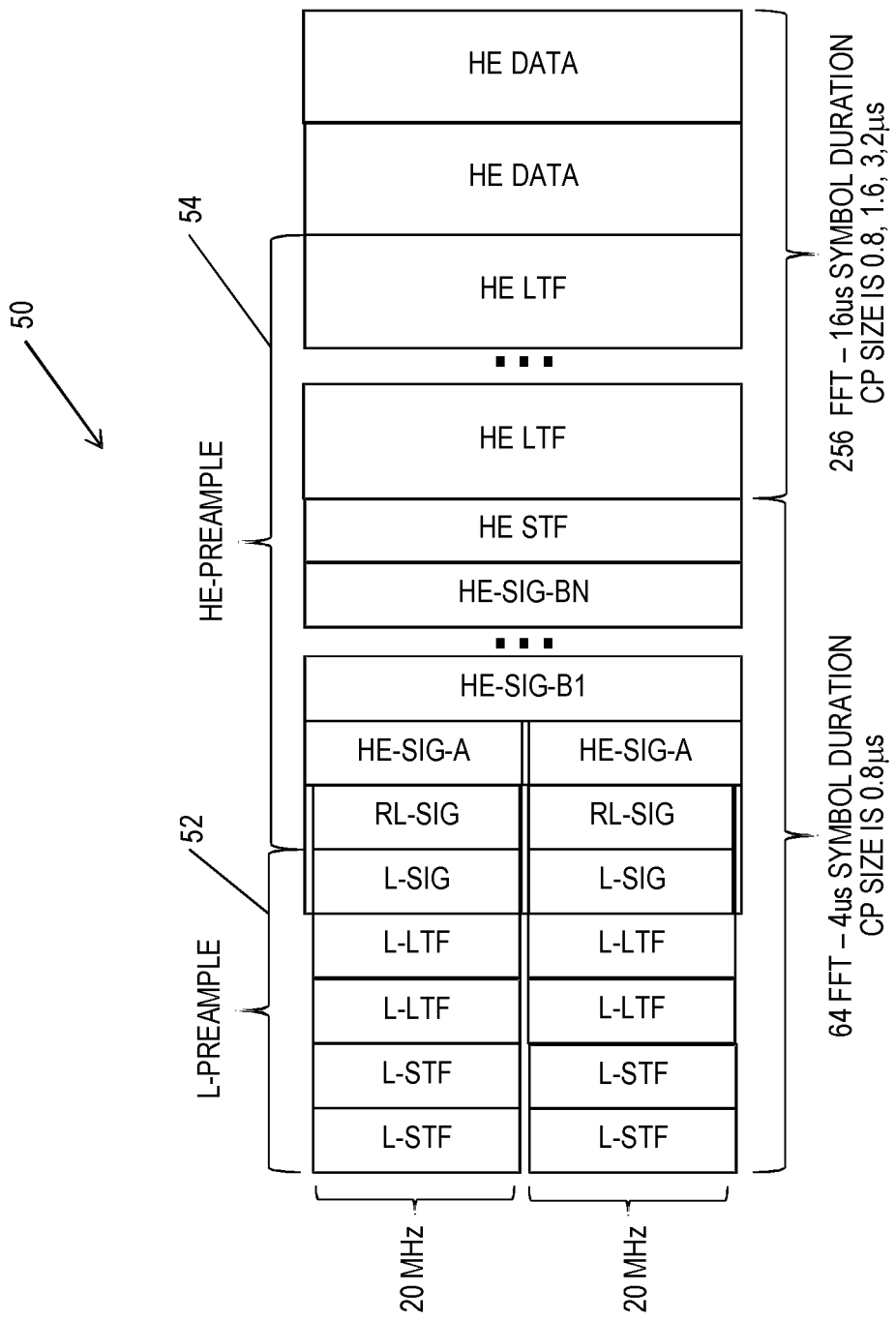
FIG. 3 shows an exemplary preamble of an OFDM symbol used for 802.11ax communications.

The solution presented herein is described in terms different types of devices. Exemplary types of devices include, but are not limited to "ax devices," i.e., those devices bound by the IEEE 802.11ax standard, and "non-ax devices," i.e., those devices bound by all variants of the IEEE 802.11 standards except IEEE 802.11ax. Before providing additional details, the following first provides some basic information regarding the types of packets transmitted for different types of 802.11 devices. FIG. 3 shows an exemplary preamble 50 for 802.11ax packets associated with ax devices. Preamble 50 comprises a legacy (L) preamble 52 and a high throughput (HT) preamble 54. The legacy preamble 52 is the same for all OFDM-based 802.11 variants, e.g., 11n and 11ac, and is needed for proper coexistence. As understood by those skilled in the art, each new variant to the IEEE 802.11 standard adds a new preamble directly following the legacy preamble. The fields in the preambles are Short Training Fields (STFs), Long Training Fields (LTFs), and Signal Fields (SIGs). As shown in FIG. 3, the legacy preamble 52 is generated with a 64-point Fast Fourier Transform (FFT), while parts of the high throughput preamble 54 are generated with a 256-point FFT and other parts of the high throughput preamble 54 are generated with the 64-point FFT. The solution presented herein exploits these characteristics of the legacy and high throughput preambles to identify 802.11ax signals, and thus to identify ax devices and non-ax devices, without requiring the received signals to be decoded. As such, the solution presented herein provides the network node 20 with the ability to identify different types of devices without decoding received signals, and thus enables the network node 20 to more efficiently select frequency channel(s) for scheduled communications with the wireless communication device 30 in an unlicensed band. It will be appreciated that the solution presented herein may be used to distinguish between other types of devices that also have different symbol lengths, and thus that facilitate differentiation based on these symbol lengths.

In exemplary embodiments, the solution presented herein makes use of the structure of the OFDM symbols to detect the presence of 802.11ax transmissions, and thus to identify the types of devices on different frequency channels. To that end, network node 20 correlates a received signal with a delayed version of the received signal, and uses the autocorrelation results to identify the type(s) of device(s) 32 associated with each frequency channel, and selects a frequency channel for unlicensed communications with a wireless communication device 30 responsive to this information. The wireless communication device 30 is connected to or associated with the network node 20, whereas the device (s) 32 are not connected to or associated with the network node 20.

Figure 4:
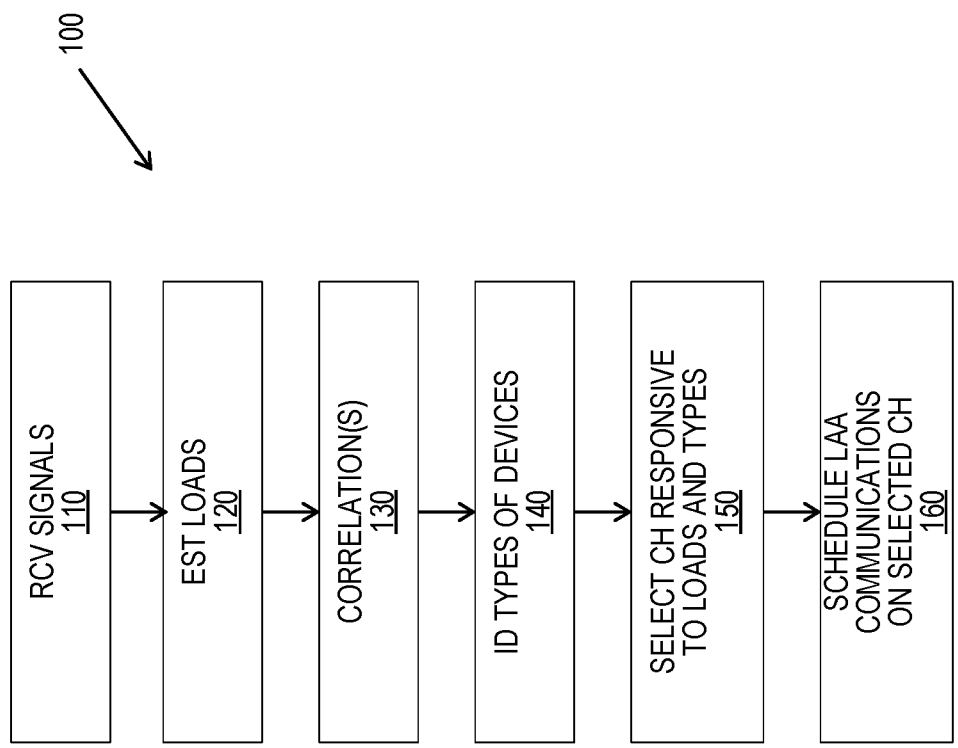
FIG. 4 shows method of selecting frequency channels for a wireless network operating in an unlicensed band according to one exemplary embodiment.

FIG. 4 shows one exemplary method 100 of selecting frequency channels for a wireless network operating in an unlicensed band as implemented by the network node 20. As shown in FIG. 2, the wireless network 10 comprises a network node 20 and one or more wireless communication devices 30, where the network node 20 is configured to send downlink signals to the wireless communication device 30 and to receive uplink signals from the wireless communication device 30. Method 100, which is implemented by the network node 20, comprises receiving a signal for each of two or more frequency channels (block 110), and estimating a load of each of the two or more frequency channels responsive to the received signals (block 120). For example, the network node 20 may estimate the load by measuring, for each frequency channel, the fraction of time of the received signal that the frequency channel is occupied. For each of the two or more frequency channels, the method 100 further comprises correlating the corresponding received signal with one or more delayed versions of the corresponding received signal to generate one or more autocorrelation results, where each delayed version of the corresponding received signal is associated with a different delay (block 130). For each of the two or more frequency channels, the method 100 further comprises identifying one or more types of wireless communication devices 32 associated with the corresponding received signal using at least one of the one or more autocorrelation results (block 140). The method 100 further comprises selecting one of the two or more frequency channels for the unlicensed band responsive to the estimated loads and the identified types of wireless communication devices 32 (block 150), and scheduling communications in the unlicensed band with the wireless communication device on the selected frequency channel (block 160).

Figure 5:
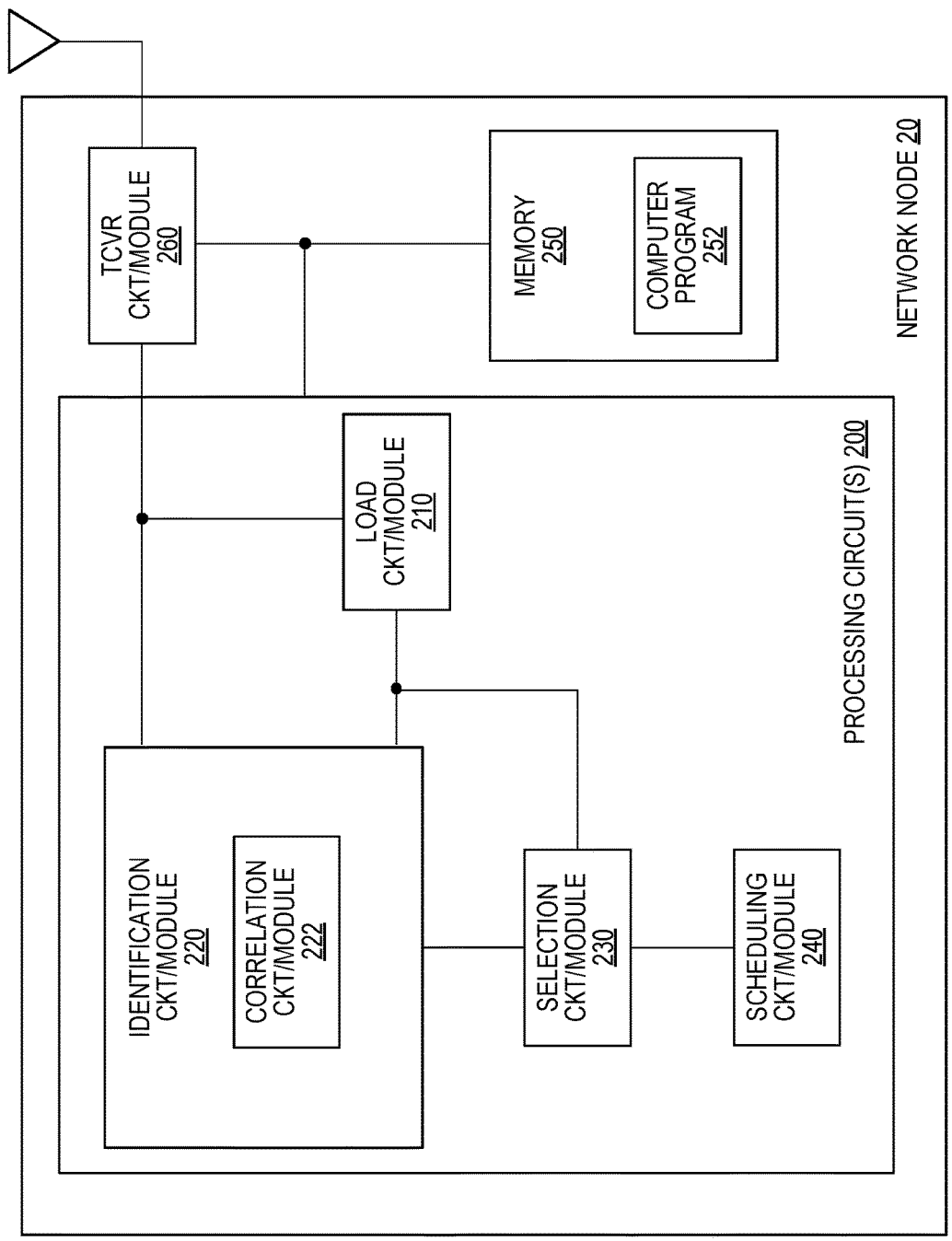
FIG. 5 shows an exemplary block diagram of a network node configured to implement the method of FIG. 4.

FIG. 5 shows a block diagram for one exemplary network node 20 implemented in accordance with one or more embodiments. Network node 20 comprises one or more processing circuits 200, a memory 250, and a transceiver circuit/module 260. The transceiver circuit/module 260 is configured to receive a signal for each of two or more frequency channels. The processing circuit(s) 200 are configured to evaluate the received signal without demodulating the received signal to identify one or more types of devices 32 for each of the frequency channels, select one of the frequency channels for the unlicensed band responsive to the evaluation, and schedule communications in the unlicensed band with a wireless communication device 30 on the selected frequency channel. As shown, the processing circuit(s) 200 in network node 20 executes the method of FIG. 4 using various functional means, units, circuits, or modules. These functional means, units, circuits, or modules include, for example, a load circuit/module 210, an identification circuit/module 220, a selection circuit/module 230, and a scheduling circuit/module 240. The load circuit/module 210 is configured to estimate a load of each of the two or more frequency channels responsive to the received signals. For example, the load circuit/module 210 may estimate the load by measuring, for each frequency channel, the fraction of time of the received signal that the frequency channel is occupied. The identification circuit/module 220 comprises a correlation circuit/module 222 configured to, for each of the two or more frequency channels, correlate the corresponding received signal with one or more delayed versions of the corresponding received signal to generate one or more autocorrelation results. Each delayed version of the corresponding received signal is associated with a different delay. The identification circuit/module 220 is configured to identify, for each of the two or more frequency channels, one or more types of wireless communication devices 32 associated with the corresponding received signal using at least one of the one or more autocorrelation results produced by the correlation circuit/module 222. The selection circuit/module 230 is configured to select one of the two or more frequency channels for the unlicensed band responsive to the estimated loads and the identified types of wireless communication devices 32. The scheduling circuit/module 240 is configured to schedule communications in the unlicensed band with the wireless communication device 30 on the selected frequency channel.

The following describes the solution in terms of first and second delays used to generate first and second autocorrelation results, which are used to identify one or more types of wireless communication devices, and where the first delay is greater than the second delay. In particular, the following describes how the network node 20 uses autocorrelation of the received signal to identify what types of preamble(s) are used in the received signal, and thus to identify what types of wireless communication devices are present in the received signal. It will be appreciated, however, that the solution presented herein applies to more than two delays, and thus to more than the two corresponding autocorrelation results.

Figure 6:
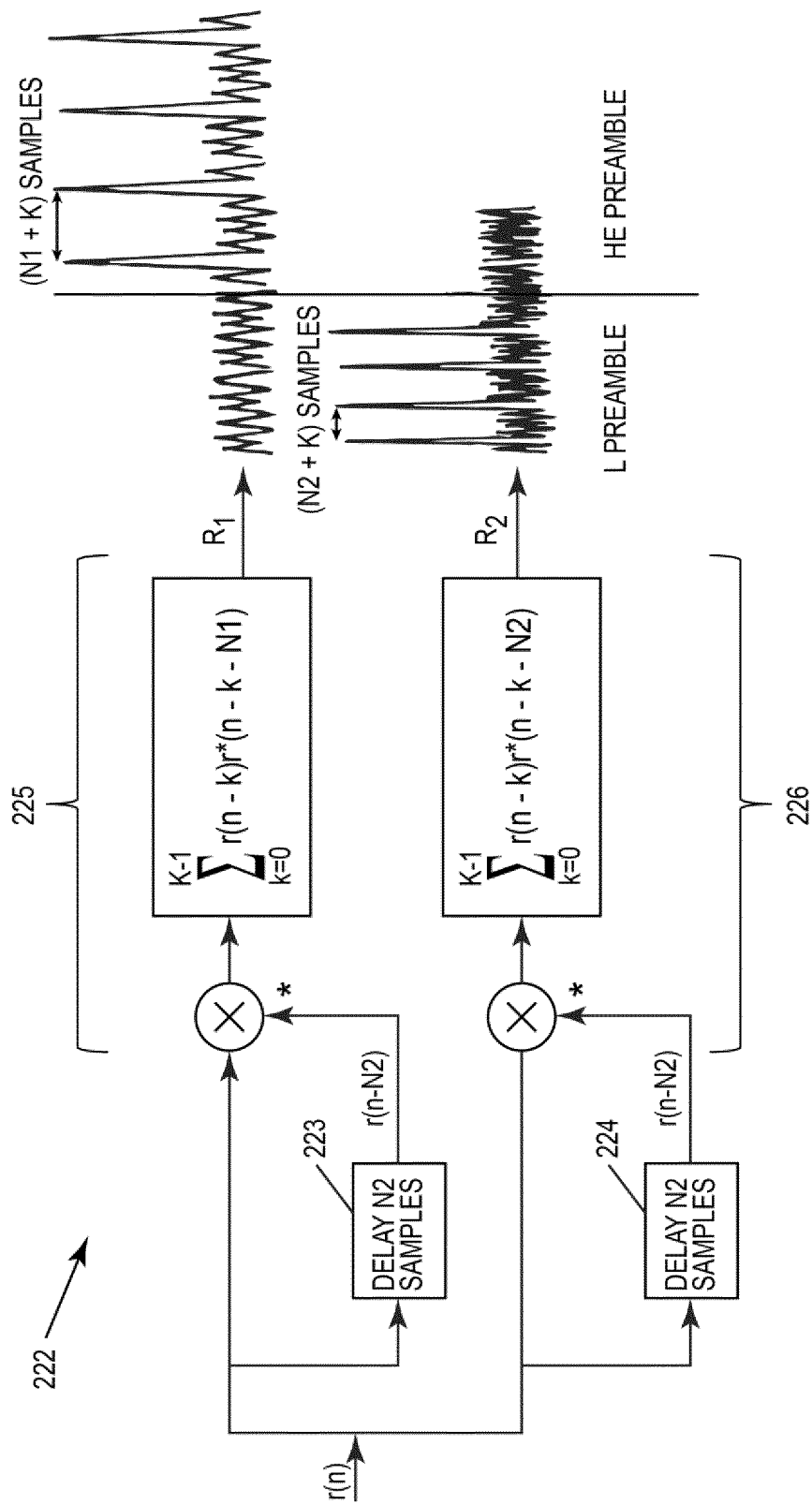
FIG. 6 shows an implementation of the correlation circuit/module of FIG. 5 according to one exemplary embodiment.

FIG. 6 demonstrates one exemplary correlation of a received signal r(n) with a delayed version of the received signal r(n−N) (block 130 in FIG. 4), as executed by the correlation circuit/module 222. In this example, the correlation circuit/module 222 comprises a first delay circuit/module 223, a second delay circuit/module 224, a first multiplier/summer circuit/module 225, and a second multiplier/summer circuit/module 226. The first delay circuit/module 223 delays the received signal r(n) by a first delay N1 to generate a first delayed signal r(n−N1), and the second delay circuit/module 224 delays the received signal r(n) by a second delay N2 to generate a second delayed signal r(n−N2). It will be appreciated that the first and second delays are generally selected by the network node 20 to correspond to the FFT characteristics of the different preambles associated with the different type of 802.11 devices 32 being considered. For example, network node 20 may set N1 to 12.8 us, where 12.8 us corresponds to the duration of the useful part of an OFDM symbol generated with a 256-point FFT of a 20 MHz channel associated with the high throughput preamble 54, and may set N2 to 3.2 us, where 3.2 us corresponds to the duration of the useful part of an OFDM symbol generated with a 64-point FFT of a 20 MHz channel associated with the legacy preamble 52 due to the 64-point FFT. The first multiplier/summer circuit/module 225 generates a first autocorrelation result $R_1$ according to Equations (1.1), and the second multiplier/summer circuit/module 226 generates a second autocorrelation result $R_2$ according to Equation (1.2), where K represents the length of the cyclic prefix (CP) in samples. For example, a 64-point FFT adds a CP of 0.8 us, while a 256-point FFT adds a CP of 0.8 us, 1.6 us, or 3.2 us; K represents these lengths in samples.

$$R_1 = \sum_{k=0}^{K-1} r(n-k)r^*(n-k-N1) \quad (1.1)$$

$$R_2 = \sum_{k=0}^{K-1} r(n-k)r^*(n-k-N2) \quad (1.2)$$

As a result, $R_1$ will only produce peaks in the time domain where (and if) the received signal includes the high throughput preamble 54, while $R_2$ will only produce peaks in the time domain where the received signal includes the legacy preamble 52. Further, as shown in FIG. 6, any peaks in $R_1$ will be separated by N1+K, which represents the total length of the OFDM symbol, e.g., the duration of the useful part of the OFDM symbol plus the duration of the associated cyclic prefix. Similarly, any peaks in $R_2$ will be separated by N2+K, which represents the total length of the OFDM symbol, e.g., the duration of the useful part of the OFDM symbol plus the duration of the associated cyclic prefix. While FIG. 6 shows the processing associated with the delays and corresponding correlations occurring in parallel processing paths, it will be appreciated that such parallel processing is not required. In some embodiments, for example, the correlation circuit/module 222 may sequentially implement each correlation. It will be appreciated that while the number of terms used when calculating the autocorrelation in this example is selected to be identical to the number of samples K in the CP, the solution presented herein is not so limited. The network node 20 may use a smaller number of terms, for example. Regardless of how many terms are used when calculating the autocorrelation, however, the distance between the peaks will still be defined by the total length of the OFDM symbol, e.g., N1+K when the high throughput preamble is present and N2+K when the legacy preamble is present.

The identification circuit/module 220 evaluates the autocorrelation results, e.g., $R_1$ and $R_2$, to determine the type of devices 32 associated with each frequency channel. This evaluation generally involves evaluating the peaks (or lack thereof) in each autocorrelation result. The following provides various different examples for evaluating the autocorrelation results to determine the types of devices 32 associated with each frequency channel. It will be appreciated, however, that the solution presented herein is not limited to these examples.

In one exemplary embodiment, the identification circuit/module 220 may identify the types of device(s) 32 associated with the received signal dependent upon which of the autocorrelation result(s) includes multiple peaks. For example, if the first autocorrelation result includes multiple peaks and/or both autocorrelation results include multiple peaks, the identification circuit/module 220 may associate the received signal with a first device, e.g., an ax device. If, however, only one of the autocorrelation results includes multiple peaks, e.g., the second autocorrelation result, the identification circuit/module 220 may associate the received signal with non-ax devices.

In another exemplary embodiment, the identification circuit/module 220 may identify the types of device(s) 32 associated with the received signal dependent upon the distance between two consecutive peaks in the autocorrelation results. For example, the identification circuit/module 220 may associate the received signal with a first type of device 32, e.g., an ax device, if the distance between two consecutive peaks exceeds a threshold, and associate the received signal with a second type of device 32, e.g., a non-ax device, if the distance between two consecutive peaks is less than a threshold. In this example, the identification circuit/module 220 would set the threshold to a predetermined value between the peak separations expected for the different types of devices 32, e.g., to a value between N1+K and N2+K.

In yet another exemplary embodiment, the identification circuit/module 220 may rely on the time-location of the peaks within the autocorrelation results. For example, the identification circuit/module 220 may associate the received signal with a first type of device 32, e.g., an ax device, if one autocorrelation result produces multiple peaks for a first part of the received signal and another autocorrelation result produces multiple peaks for a second part of the received signal. Alternatively, the identification circuit/module 220 may associate the received signal with a second type of device 32, e.g., a non-ax device, when multiple peaks are only produced for part of the received signal.

In another exemplary embodiment, the identification circuit/module 220 may only rely upon one autocorrelation result. In this exemplary embodiment, the correlation circuit/module 222 delays the received signal by a delay corresponding to the ax preamble, e.g., the N1 delay corresponding to the 256-point FFT. The identification circuit/module 220 then associates the received signal with a first type of device 32, e.g., an ax device, when the autocorrelation result produces multiple peaks, and associates the received signal with a second type of device 32, e.g., a non-ax device, when the autocorrelation result produces no peaks.

The network node 20 may also use the autocorrelation result(s) to provide additional information that may be used by the selection circuit/module 230 to improve the selection effort. For example, the identification circuit/module 220, using the autocorrelation result(s), may estimate a number of packets associated with each identified type of device 32 and/or estimate a number of devices associated with each identified type of device 32. The selection circuit/module 230 then selects one of the frequency channels responsive to the estimated load, the identified types of devices 32, as well as the estimated number of packets and/or the estimated number of devices. In another embodiment, the identification circuit/module 220 may estimate what fraction of each frequency channel is occupied by each type of device 32 using the autocorrelation result(s). For example, the identification circuit/module 220 may estimate this fraction by determining, using the autocorrelation results, how much of the total correlation time is used for transmission of OFDM symbols associated with one type of device 32 and how much of the total correlation time is used for transmission of OFDM symbols associated with another type of device 32. In this example, the selection circuit/module 230 selects one of the frequency channels responsive to the estimated load, the identified types of wireless communication devices 32, and the estimated fraction.

The following provides two detailed examples for the solution presented herein: Example A and Example B. These examples are included to further demonstrate the solution presented herein, and are not intended to limit the scope of the appended claims.

In Example A, two auto-correlations are performed, with the delays used by the correlation circuit/module 222 corresponding to 3.2 us and 12.8 us. The first delay (i.e., 12.8 us) corresponds to the duration of the useful part of an OFDM symbol generated with a 256-point FFT for a 20 MHz channel, and the second delay (i.e., 3.2 us) corresponds to an OFDM symbol generated with a 64-point FFT. Thus, a first autocorrelation result produced by the correlation circuit/module 222 using the first delay will generate a correlation (i.e., one or more peaks) when the longer symbol is present in the received signal, whereas a second autocorrelation result produced by the correlation circuit/module 222 using the second delay will generate a correlation (i.e., one or more peaks) if the shorter symbol is present in the received signal. The distance between consecutive peaks will equal the total length of the OFDM symbol, i.e., the duration of the useful part plus the duration of the Cyclic Prefix (CP). It will be appreciated that the network node 20 may use the distance between consecutive peaks information to determine the length of the CP in case this is not known beforehand. The solution presented herein, however, may use the distance between consecutive peaks information to identify how often the longer OFDM symbols are used, and thus how often ax-devices are used. Therefore, according to this example, the network node 20 need only determine the duration for when the autocorrelation results output by the correlation circuit/module 222 contains peaks. Thus, according to this exemplary embodiment, a network node 20 uses the two autocorrelation results output by the correlation circuit/module 222 to determine how much of the total time is used for transmitting long OFDM symbols and how much the total time is used for transmitting short OFDM symbols, respectively. When deciding which one of two possible frequency channel to select for LAA, the network node 20 uses this information along with an estimated load for each frequency channel.

Figure 7:
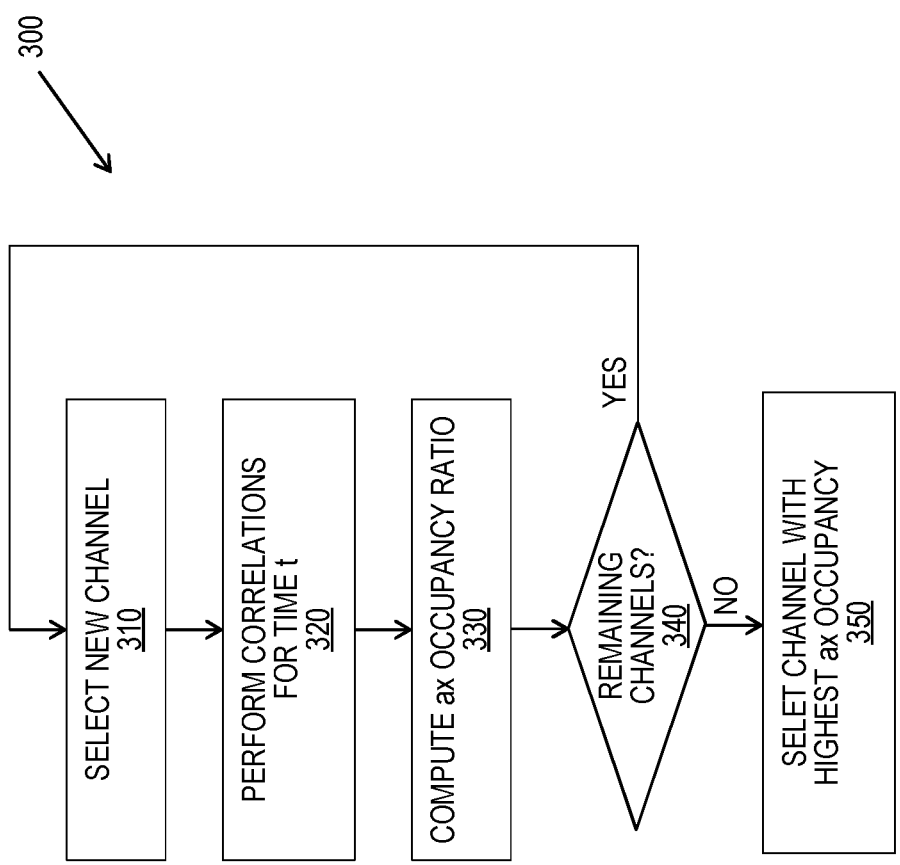
FIG. 7 shows a method of selecting frequency channels for a wireless network operating in an unlicensed band according to another exemplary embodiment.

For example, consider the exemplary method 300 of FIG. 7, and suppose the approach is used for selecting between two frequency channels: CH1 and CH2. The correlation circuit/module 222 selects one frequency channel, e.g., CH1 (block 310), and performs correlations for CH1 for a time t, e.g., one second (block 320). From the resulting first and second autocorrelation results, the identification circuit/module 220 finds that no long symbols are transmitted on CH1, from which the identification circuit/module 220 concludes that ax devices are not used (block 330). The identification circuit/module 220 finds, however, that short symbols are present 50% of the time on CH1, and thus that the channel has a "non-ax" load of 50%. If frequency channels are remaining (block 340), the correlation circuit/module 222 selects the next frequency channel (block 310), e.g., CH2, and performs correlations for CH2 for a time t, e.g., one second (block 320). From the resulting first and second autocorrelation results, the identification circuit/module 220 finds that the short OFDM symbols on CH2 are found only a few percent of the time, whereas the long symbols are found on CH2 60% of the time. Based on this observation, the identification circuit/module 220 concludes that all transmissions on CH2 are according to the 802.11ax standard, where the small percentage of short symbols corresponds to the initial part of the 802.11ax packets, i.e., the legacy preamble (block 330). Because the transmissions for CH2 are assumed to be scheduled by the corresponding AP 22, network node 20 will effectively only contend with one Wi-Fi device for CH2, i.e., the AP 22. For CH1, all the STAs 32 will contend for the channel, which effectively means that the network node 20 will potentially have to compete with a large number of Wi-Fi devices. As such, the network node 20 has a small probability of winning the contention on CH1. Therefore, although the load is higher for CH2, the selection circuit/module 230 may still select to use CH2 (block 350), to increase the probability of winning the contention.

Example A considered the fraction of the correlation time having long and short symbols. Example B demonstrates how to explicitly identify 802.11ax packets and non-802.11ax packets by identifying packets that start with short symbols and then switch to long symbols, which would correspond to an 802.11ax packet. Packets only containing short symbols, on the other hand, would instead correspond to non-802.11ax packets. Similarly to the Example A, the relative use of the two packets can advantageously be used to select a suitable channel. While the implementation of Example B may be slightly more complex than the implementation of Example A, Example B produces a better understanding of the traffic. In addition, network node 20 may optionally also determine statistics on how many packets are transmitted per time unit, in addition to considering the occupancy of the frequency channel. It may, for example, be useful for the network node 20 to know if the traffic contains many short packets or a small number of relatively large ones.

The identification circuit/module 220 may optionally filter over several OFDM symbol durations to improve the detection performance. There are at least eight OFDM symbols of length 4 us from the legacy preamble and parts of the HE preamble. The number of long OFDM symbols of length 16 us varies with the size of the payload. Such filtering may be useful, for example, when the delay spread of the channel is relatively large, and therefore the CP to a large extend contains interference from the previous symbol, and thus when it may be harder to separate the peaks from the noise. In this case, the filtering in time will help remove at least some of the noise, and thus make it easier to identify the peaks.

Those skilled in the art will also appreciate that embodiments herein further include corresponding computer programs. A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium, e.g., a non-transitory computer readable medium.

The solution presented herein ensures that a system will have a higher probability of accessing a channel by considering the effective number of competing devices, and also therefore reduces the number of collisions between uplink devices, and thus increases the performance, e.g., increase throughput and decrease delay, associated with the unlicensed frequency band on a frequency channel having mostly ax devices. Further, the solution presented herein increases the performance of the overall 802.11ax network as compared to the performance of the 802.11ax network coexisting with a non-802.11ax network. For example, because LAA cells have scheduled uplinks, there would be contention between two LAA cells (with two different operators). This contention is similar to that which would be experienced with one 802.11ax BSS and one LAA cell. Further, the solution presented herein uses autocorrelation of the received signal to identify the type(s) of wireless communication devices 32 associated with each frequency channel, and thus enables the network node 20 to identify the types of the devices 32 without having to decode the received signal. Further, the solution presented herein enables the network node 20 to acquire a larger portion of the channel capacity on a channel with mostly ax devices as compared to a channel with non-ax devices. For example, the network node 20 may be able to acquire 50% of a frequency channel having only ax devices because it only has to contend with the AP 14, and not each ax device. The solution presented herein may, of course, be carried out in other ways than those specifically set forth herein without departing from essential characteristics of the solution presented herein. The present embodiments are to be considered in all respects as illustrative and not restrictive, and all changes coming within the meaning and equivalency range of the appended embodiments are intended to be embraced therein.

What is claimed is:

1. A method of selecting frequency channels for a wireless network operating in an unlicensed band and comprising a network node and a wireless communication device, the network node configured to send downlink signals to the wireless communication device and to receive uplink signals from the wireless communication device, the method implemented by the network node and comprising:
receiving a signal for each of two or more frequency channels;
estimating a load of each of the two or more frequency channels responsive to the received signals;
for each of the two or more frequency channels:
correlating the corresponding received signal with one or more delayed versions of the corresponding received signal to generate one or more autocorrelation results, wherein each delayed version of the corresponding received signal is associated with a different delay;
identifying one or more types of wireless communication devices associated with the corresponding received signal using at least one of the one or more autocorrelation results;
selecting one of the two or more frequency channels for the unlicensed band responsive to the estimated loads and the identified types of wireless communication devices; and
scheduling communications in the unlicensed band with the wireless communication device on the selected frequency channel.

2. The method of claim 1 wherein correlating the corresponding received signal with one or more delayed versions of the corresponding received signal comprises, for each of the two or more frequency channels:
delaying the corresponding received signal by a first delay and by a second delay to respectively generate a first delayed signal and a second delayed signal, the first delay being different than the second delay;
correlating the corresponding received signal with the first delayed signal to generate a first autocorrelation result;
correlating the corresponding received signal with the second delayed signal to generate a second autocorrelation result; and
wherein identifying the one or more types of wireless communication devices comprises identifying the one or more types of wireless communication devices associated with the corresponding received signal using the first and second autocorrelation results.

3. The method of claim 2 wherein the first delay is greater than the second delay, and wherein identifying the one or more types of wireless communication devices comprises, for each of the two or more frequency channels, associating a first type of wireless communication device with the corresponding received signal when the first autocorrelation result includes multiple peaks or when the first and second autocorrelation results include multiple peaks, and associating a second type of wireless communication device with the corresponding received signal when only the second autocorrelation result includes multiple peaks.

4. The method of claim 1 wherein identifying the one or more types of wireless communication devices comprises, for each of the two or more frequency channels:
measuring a distance between two consecutive peaks in at least one of the autocorrelation results;
associating the corresponding received signal with a first type of wireless communication device when the measured distance exceeds a predetermined threshold; and
associating the corresponding received signal with a second type of wireless communication device when the measured distance is less than the predetermined threshold.

5. The method of claim 1 wherein correlating the corresponding received signal with one or more delayed versions of the corresponding received signal comprises correlating the corresponding received signal with one delayed version of the corresponding received signal to generate a first autocorrelation result, wherein identifying the one or more types of wireless communication devices comprises:
associating the corresponding received signal with a first type of wireless communication device when the first autocorrelation result produces multiple peaks; and
associating the corresponding received signal with a second type of wireless communication device when the first autocorrelation result produces no peaks.

6. The method of claim 1 wherein identifying the one or more types of wireless communication devices comprises:

associating the corresponding received signal with a first type of wireless communication device when a first one of the one or more autocorrelation results produces multiple peaks for a first part of the corresponding received signal and a second one of the one or more autocorrelation results produces multiple peaks for a second part of the corresponding received signal; and associating the corresponding received signal with a second type of wireless communication device when the one or more autocorrelation results produces multiple peaks for the first part or the second part of the corresponding received signal.

7. The method of claim 1 further comprising estimating a number of packets associated with each type of wireless communication device using at least one of the one or more autocorrelation results, wherein selecting one of the two or more frequency channels comprises selecting one of the two or more frequency channels responsive to the estimated loads, the identified types of wireless communication devices, and the estimated number of packets.

8. The method of claim 1 further comprising estimating a number of devices associated with each type of wireless communication device using at least one of the one or more autocorrelation results, wherein selecting one of the two or more frequency channels comprises selecting one of the two or more frequency channels responsive to the estimated loads, the identified types of wireless communication devices, and the estimated number of devices.

9. The method of claim 1 further comprising:
estimating a number of packets associated with each type of wireless communication device using at least one of the one or more autocorrelation results;
estimating a number of devices associated with each type of wireless communication device using at least one of the one or more autocorrelation results;
wherein selecting one of the two or more frequency channels comprises selecting one of the two or more frequency channels responsive to the estimated loads, the identified types of wireless communication devices, the estimated number of devices, and the estimated number of packets.

10. The method of claim 1 further comprising estimating what fraction of each frequency channel is occupied by each type of wireless communication device using the one or more autocorrelation results, wherein selecting one of the two or more frequency channels comprises selecting one of the two or more frequency channels responsive to the estimated loads, the identified types of wireless communication devices, and the estimated fraction.

11. The method of claim 1 wherein the one or more types of wireless communication devices comprises different first and second types of wireless communication devices, wherein the first type of wireless communication device is configured according to IEEE 802.11ax and wherein the second type of wireless communication device is not configured for IEEE 802.11ax.

12. The method of claim 1 wherein estimating the load of each of the two or more frequency channels comprises measuring, for each frequency channel, a fraction of time of the received signal that the corresponding frequency channel is occupied.

13. A network node in a wireless network operating in an unlicensed band, the wireless network comprising the network node and a wireless communication device, the network node configured to send downlink signals to the wireless communication device and to receive uplink signals from the wireless communication device, the network node comprising:
a transceiver circuit configured to receive a signal for each of two or more frequency channels;
a load circuit configured to estimate a load of each of the two or more frequency channels responsive to the received signals;
an identification circuit comprising:
a correlation circuit configured to, for each of the two or more frequency channels, correlate the corresponding received signal with one or more delayed versions of the corresponding received signal to generate one or more autocorrelation results, wherein each delayed version of the corresponding received signal is associated with a different delay;
wherein the identification circuit is configured to identify, for each of the two or more frequency channels, one or more types of wireless communication devices associated with the corresponding received signal using at least one of the one or more autocorrelation results;
a selection circuit configured to select one of the two or more frequency channels for the unlicensed band responsive to the estimated loads and the identified types of wireless communication devices; and
a scheduling circuit configured to schedule communications in the unlicensed band with the wireless communication device on the selected frequency channel.

14. The network node of claim 13 wherein the correlation circuit is configured to correlate the corresponding received signal with one or more delayed versions of the corresponding received signal by, for each of the two or more frequency channels:
delaying the corresponding received signal by a first delay and by a second delay to respectively generate a first delayed signal and a second delayed signal, the first delay being different than the second delay;
correlating the corresponding received signal with the first delayed signal to generate a first autocorrelation result; and
correlating the corresponding received signal with the second delayed signal to generate a second autocorrelation result;
wherein the identification circuit is configured to identify the one or more types of wireless communication devices by, for each of the two or more frequency channels, identifying the one or more types of wireless communication devices associated with the corresponding received signal using the first and second autocorrelation results.

15. A non-transitory computer readable medium storing a computer program product for controlling a network node comprising instructions which, when executed on at least one processor of the network node, causes the network node to:
receive a signal for each of two or more frequency channels;
estimate a load of each of the two or more frequency channels responsive to the received signals;
for each of the two or more frequency channels:
correlate the corresponding received signal with one or more delayed versions of the corresponding received signal to generate one or more autocorrelation results,
wherein each delayed version of the corresponding received signal is associated with a different delay;

identify one or more types of wireless communication devices associated with the corresponding received signal using at least one of the one or more autocorrelation results;

select one of the two or more frequency channels for the unlicensed band responsive to the estimated loads and the identified types of wireless communication devices; and schedule communications in the unlicensed band with the wireless communication device on the selected frequency channel.

* * * * *